US012578543B2

(12) United States Patent
Zhang et al.

(10) Patent No.: US 12,578,543 B2
(45) Date of Patent: Mar. 17, 2026

(54) PREFABRICATED CABLE

(71) Applicant: HUAWEI TECHNOLOGIES CO., LTD., Shenzhen (CN)

(72) Inventors: Jinxing Zhang, Haikou (CN); Wei Xiong, Shenzhen (CN); Zhijian Zhang, Wuhan (CN)

(73) Assignee: Huawei Technologies Co., LTD., Shenzhen (CN)

( * ) Notice: Subject to any disclaimer, the term of this patent is extended or adjusted under 35 U.S.C. 154(b) by 307 days.

(21) Appl. No.: 18/312,714

(22) Filed: May 5, 2023

(65) Prior Publication Data

US 2023/0273389 A1 Aug. 31, 2023

Related U.S. Application Data

(63) Continuation of application No. PCT/CN2021/121332, filed on Sep. 28, 2021.

(30) Foreign Application Priority Data

Nov. 9, 2020 (CN) .......................... 202022577615.4

(51) Int. Cl.
G02B 6/44 (2006.01)
(52) U.S. Cl.
CPC ................................ G02B 6/44765 (2023.05)
(58) Field of Classification Search
CPC .................................................. G02B 6/44765
See application file for complete search history.

(56) References Cited

U.S. PATENT DOCUMENTS

| | | | | |
|---|---|---|---|---|
| 4,684,211 | A | * 8/1987 | Weber | G02B 6/545 |
| | | | | 385/136 |
| 5,480,203 | A | 1/1996 | Favalora et al. | |
| 10,670,823 | B2 * | 6/2020 | Levy | G02B 6/4431 |
| 2011/0150398 | A1 | 6/2011 | Zimmel et al. | |
| 2018/0067275 | A1 | 3/2018 | Levy | |

FOREIGN PATENT DOCUMENTS

CN 214097898 U 8/2021

OTHER PUBLICATIONS

International Search Report and Written Opinion in International Appln. No. PCT/CN2021/121332, mailed on Dec. 3, 2021, 15 pages (with English translation).
Extended European Search Report in European Appin No. 21888332. 0, dated Apr. 22, 2024, 9 pages.

* cited by examiner

*Primary Examiner* — Sung H Pak
(74) *Attorney, Agent, or Firm* — Fish & Richardson P.C.

(57) ABSTRACT

This application discloses a prefabricated cable, and relates to the field of communication technologies. In one example, the prefabricated cable includes an optical cable, an optical fiber connector, a traction member, and a branch cable fastener. The optical cable sequentially includes an insertion section, an optical cable connection section, and an optical cable extension section. The optical fiber connector is connected to an end of the insertion section. The traction member includes a traction section and a traction member connection section. The traction member connection section is connected to the optical cable connection section through the branch cable fastener. The insertion section and the traction section extend in a same direction.

20 Claims, 3 Drawing Sheets

PREFABRICATED CABLE

CROSS-REFERENCE TO RELATED APPLICATIONS

This application is a continuation of International Application No. PCT/CN2021/121332, filed on Sep. 28, 2021, which claims priority to Chinese Patent Application No. 202022577615.4, filed on Nov. 9, 2020. The disclosures of the aforementioned applications are hereby incorporated by reference in their entireties.

TECHNICAL FIELD

This application relates to the field of communication technologies, and in particular, to a prefabricated cable.

BACKGROUND

With rapid development of optical distribution networks (ODNs), prefabricated cables are more widely used. The prefabricated cable includes an optical cable and an optical fiber connector. One or each of two ends of the optical cable is connected to an optical fiber connector. To use the prefabricated cable, the optical fiber connector is directly plugged to a device that needs to be connected, without fusion splicing. Such a plug-and-play fast network construction mode is very convenient.

However, during network construction, construction personnel are likely to drag the optical fiber connector with a hand to pull the prefabricated cable. Because the optical fiber connector has a precise structure, and a connection part between the optical fiber connector and the optical cable is relatively fragile, the prefabricated cable is easily damaged during network construction.

SUMMARY

Embodiments of this application provide a prefabricated cable. The prefabricated cable includes a traction member. During network construction, construction personnel may pull the prefabricated cable by dragging the traction member with a hand, so as to reduce a possibility of damage to the prefabricated cable. A technical solution of the prefabricated cable is described as follows.

An embodiment of this application provides a prefabricated cable. The prefabricated cable includes an optical cable, an optical fiber connector, a traction member, and a branch cable fastener. The optical cable sequentially includes an insertion section, an optical cable connection section, and an optical cable extension section. The optical fiber connector is connected to an end of the insertion section. The traction member includes a traction section and a traction member connection section. The traction member connection section is connected to the optical cable connection section through the branch cable fastener, and the insertion section and the traction section extend in a same direction.

The optical cable is a communication cable component that is manufactured to meet optical, mechanical, and environmental performance specifications, uses one or more optical fibers in a jacket as a transmission medium, and can be used independently or in a group. Based on forms of optical cables, optical cables may be classified into an optical cable with an optical cable suspension wire and an optical cable without an optical cable suspension wire. When an optical cable with an optical cable suspension wire is in an initial state, the optical cable suspension wire is combined with the optical cable along a length direction. A function of the optical cable suspension wire is to ensure that the optical cable can bear its own weight under gravity and an external load in an aerial (or referred to as suspended) state, to strengthen the optical cable. An optical cable without an optical cable suspension wire has high material strength, and can bear its own weight under gravity and an external load in an aerial mode even without an optical cable suspension wire. The optical cable provided in this embodiment of this application may have an optical cable suspension wire, or may not have an optical cable suspension wire. This is not specifically limited in this application.

An optical cable provided in an embodiment of this application sequentially includes an insertion section, an optical cable connection section, and an optical cable extension section. An end of the insertion section is configured to connect to an optical fiber connector. The optical cable connection section is configured to connect to the traction member connection section through a branch cable fastener. The optical cable extension section refers to a part of the optical cable other than the insertion section and the optical cable connection section. The optical cable extension section is generally long. It should be noted that, one optical cable may have two insertion sections, two optical cable connection sections, and one optical cable extension section. For example, from one end to the other end of the optical cable, the optical cable sequentially includes an insertion section, an optical cable connection section, an optical cable extension section, and an optical cable connection section, and an insertion section. In other words, each of two ends of the prefabricated cable provided in this embodiment of this application may be connected to an optical fiber connector. It should also be noted that, the foregoing division of the optical cable into the insertion section, the optical cable connection section, and the optical cable extension section is merely logical division. In an actual product, there is no actual boundary between the insertion section, the optical cable connection section, and the optical cable extension section.

The optical fiber connector is a device for detachable connection between optical fibers, and can precisely connect two end surfaces of optical fibers, so that light energy output by a transmitting optical fiber can be coupled to a receiving optical fiber to a maximum extent. The prefabricated cable provided in this embodiment of this application may include only one optical fiber connector, or may include a plurality of optical fiber connectors. The optical cable in the prefabricated cable may have only one end connected to the optical fiber connector, or may have two ends each connected to an optical fiber connector. Specifically, each end of the prefabricated cable may be connected to one optical fiber connector, or may be connected to a plurality of optical fiber connectors. It should be noted that, the connection between the optical cable and the optical fiber connector in this embodiment of this application includes a mechanical connection between the cover of the optical cable and the optical fiber connector, and also includes an optical connection between an optical fiber in the optical cable and the optical fiber connector.

The traction member is configured to pull the optical cable. The traction member may be an optical cable suspension wire as a part of the optical cable or may be an additional component such as an additional traction rope. The traction member includes a traction section and a traction member connection section. The traction section and the insertion section extend in a same direction. The traction member connection section is connected to the optical cable connection section through the branch cable fastener. A handle end of the traction section may have a handle structure (where the handle end is an end of the traction section away from the traction member connection section), making it convenient for construction personnel to grip and apply force to the traction member. For example, the handle structure may be any structure that is convenient for construction personnel to grip, such as a pull ring, a knob handle, or a grip handle. A position of the handle end may be close to a position of the optical fiber connector.

In the solution shown in this embodiment of this application, when the prefabricated cable provided in this embodiment of this application is used during network construction, construction personnel may pull the prefabricated cable by dragging the traction member with a hand, thereby facilitating operations of the construction personnel. In addition, because the traction member is connected to the optical cable, a force-bearing point during pulling of the prefabricated cable is located on the optical cable instead of the optical fiber connector, thereby reducing a possibility of damage to the optical fiber connector and a junction between the optical fiber connector and the optical cable.

In a possible implementation, the traction member is an optical cable suspension wire. The traction member further includes a traction member extension section. The traction member extension section is located on a side of the traction member connection section away from the traction section. The optical cable extension section and the traction member extension section are integrated, and the insertion section is separated from the traction section. The branch cable fastener is sleeved on the optical cable connection section and the traction member connection section.

The branch cable fastener is configured to tightly clamp the optical cable suspension wire and the optical cable, or tightly clamp a plurality of branch cables.

In the solution shown in this embodiment of this application, for an optical cable with an optical cable suspension wire, the optical cable suspension wire of the optical cable may be used as the traction member, and no other component needs to be added, thereby reducing fabrication costs. In addition, the branch cable fastener is used to tightly clamp the traction member connection section of the traction member (the optical cable suspension wire) and the optical cable connection section together, to prevent the optical cable suspension wire from being further separated from the optical cable, and ensure that the optical cable extension section and the traction member extension section remain in an integrated state, thereby improving an effect of strengthening the optical cable by the optical cable suspension wire.

In a possible implementation, a width of a suspension wire neck of the optical cable suspension wire is greater than 0.3 mm and less than 1 mm, and a height of the suspension wire neck is greater than 0.5 mm and less than 1.5 mm.

The suspension wire neck is a joint part of the optical cable suspension wire and the optical cable.

In the solution shown in this embodiment of this application, a size of the suspension wire neck of the optical cable suspension wire is set to be within the foregoing size range, so that the size of the suspension wire neck is smaller than a size of a conventional suspension wire neck. In this way, the optical cable suspension wire and the optical cable may be stripped manually without using any tool, thereby improving stripping efficiency, and improving efficiency of connecting the optical fiber connector to the optical cable.

In addition, because the optical cable suspension wire and the optical cable do not need to be cut off by using a tool, the jacket of the optical cable is not easily damaged. In this way, tightness of a junction between the optical cable and the optical fiber connector is improved, thereby improving an IP (ingress protection) protection level of the optical fiber connector.

In a possible implementation, the traction member is a traction rope. The branch cable fastener is sleeved on the optical cable connection section. The traction member connection section is connected to the branch cable fastener.

In the solution shown in this embodiment of this application, for an optical cable without an optical cable suspension wire, the traction rope may be added as the traction member.

In a possible implementation, the branch cable fastener has two connection holes along an axial direction. The traction section includes a first traction section and a second traction section. The traction member connection section is located between the first traction section and the second traction section. Both the first traction section and the second traction section are separated from the insertion section. A part of the traction member connection section is located in the two connection holes, and the other part of the traction member connection section is located between two ends of the two connection holes away from the optical fiber connector.

In the solution shown in this embodiment of this application, the traction rope is securely and conveniently connected to the branch cable fastener by using a connection manner of passing the traction rope through the connection holes on the branch cable fastener. In addition, the traction rope forms the first traction section and the second traction section, making it more convenient for operation personnel to grip and apply force to the traction rope.

In a possible implementation, the branch cable fastener has a streamlined structure along a length direction of the optical cable.

The streamlined structure may mean that the branch cable fastener has a rounded corner structure or a chamfer structure along the length direction.

In the solution shown in this embodiment of this application, with the configuration of the branch cable fastener to have the streamlined structure, when the prefabricated cable is pulled to pass through an obstacle, the branch cable fastener is not easily stuck by the obstacle, thereby improving a capability of the prefabricated cable to pass through the obstacle.

In a possible implementation, a length of the insertion section is greater than 0.5 m and less than 1.5 m.

In the solution shown in this embodiment of this application, setting of the length of the insertion section to be greater than 0.5 m and less than 1.5 m prevents the optical cable suspension wire or a branch cable from affecting fabrication of the optical fiber connector.

In a possible implementation, the prefabricated cable further includes a bundling member. The bundling member wraps the insertion section and the traction section together.

The bundling member may be a rope, a bundling tape, or the like, but is not limited thereto.

In the solution shown in this embodiment of this application, with the configuration of the bundling member to bundle the insertion section and the traction section together, when the prefabricated cable is pulled by using the traction member, the optical fiber connector can better follow the traction member and the optical cable to move, thereby reducing amplitude of shaking of the optical fiber connector, and improving safety of the optical fiber connector.

In a possible implementation, a handle end of the traction section protrudes from a top end of the optical fiber connector, and a distance between the handle end and the top end of the optical fiber connector is less than or equal to 10 mm. Alternatively, the handle end of the traction section recedes from the top end of the optical fiber connector, and the distance between the handle end and the top end of the optical fiber connector is less than or equal to 10 mm. Alternatively, the handle end of the traction section is flush with the top end of the optical fiber connector.

The handle end is an end of the traction section away from the traction member connection section. The top end of the optical fiber connector is an end opposite to a tail end of the optical fiber connector. The tail end of the optical fiber connector is connected to the optical cable.

In the solution shown in this embodiment of this application, with the arrangement of the handle end of the traction section within the foregoing position range, a position of the handle end is substantially close to a position of the optical fiber connector, making it more convenient for construction personnel to pull the prefabricated cable through the traction member.

In a possible implementation, the handle end of the traction section has a handle structure.

The handle end is an end of the traction section away from the traction member connection section. The handle structure may be any structure that is convenient for construction personnel to grip, such as a pull ring, a knob handle, or a grip handle.

In the solution shown in this embodiment of this application, the configuration of the handle end having the handle structure allows operation personnel to conveniently grip the traction section, can more conveniently apply a pulling force.

Beneficial effects brought by the technical solutions provided in embodiments of this application are as follows.

Embodiments of this application provide a prefabricated cable. The prefabricated cable includes a traction member. A traction member connection section of the traction member is connected to an optical cable connection section of an optical cable. During network construction, construction personnel may pull the prefabricated cable by dragging the traction member with a hand. Because the traction member is connected to the optical cable, a force-bearing point during pulling of the prefabricated cable is located on the optical cable, thereby reducing a possibility of damage to the optical fiber connector and a junction between the optical fiber connector and the optical cable.

DESCRIPTION OF REFERENCE NUMERALS

1. optical cable; 11. insertion section; 12. optical cable connection section; 13. optical cable extension section;

2. optical fiber connector;
3. traction member; 31. traction section; 310. handle end; 311. first traction section; 312; second traction section; 32. traction member connection section; 33. traction member extension section;
4. branch cable fastener; 41. connection hole;
5. bundling member.

DESCRIPTION OF EMBODIMENTS

Embodiments of this application provide a prefabricated cable. The prefabricated cable may be used in construction of a network such as an optical distribution network (ODN).

Figure 1:
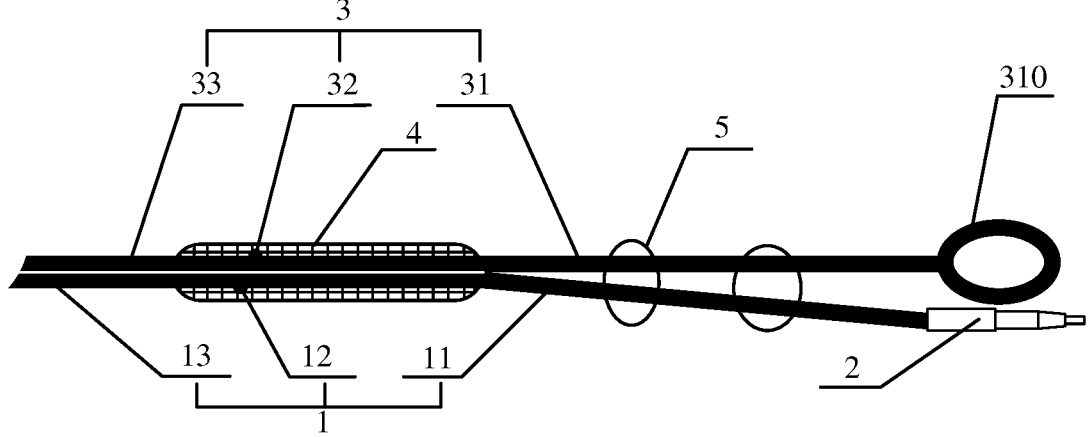
FIG. 1 is a schematic diagram of a prefabricated cable according to an embodiment of this application.
Figure 2:
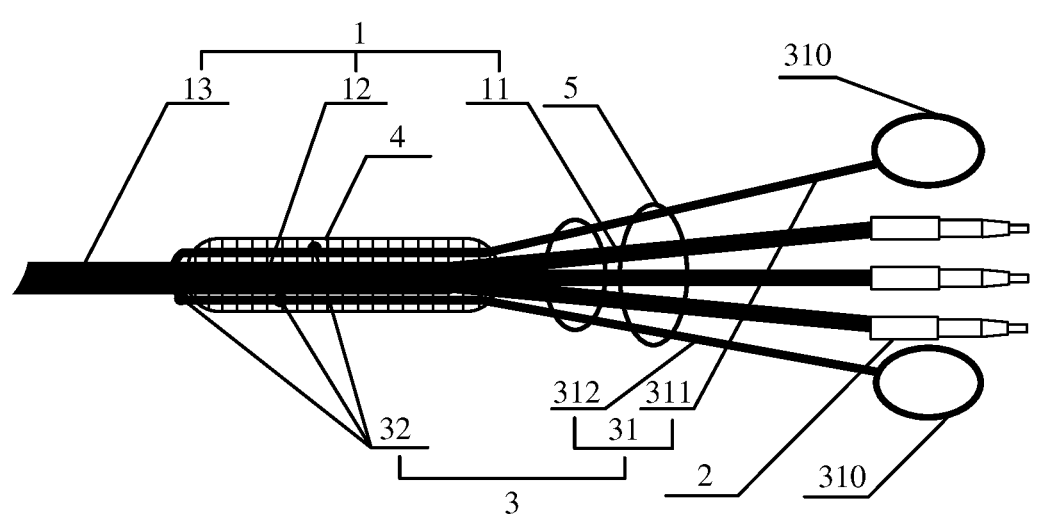
FIG. 2 is a schematic diagram of another prefabricated cable according to an embodiment of this application.

An embodiment of this application provides a prefabricated cable. As shown in FIG. 1 and FIG. 2, the prefabricated cable includes an optical cable 1, an optical fiber connector 2, a traction member 3, and a branch cable fastener 4. The optical cable 1 sequentially includes an insertion section 11, an optical cable connection section 12, and an optical cable extension section 13. The optical fiber connector 2 is connected to an end of the insertion section 11. The traction member 3 includes a traction section 31 and a traction member connection section 32. The traction member connection section 32 is connected to the optical cable connection section 12 through the branch cable fastener 4. The insertion section 11 and the traction section 31 extend in a same direction.

Figure 5:
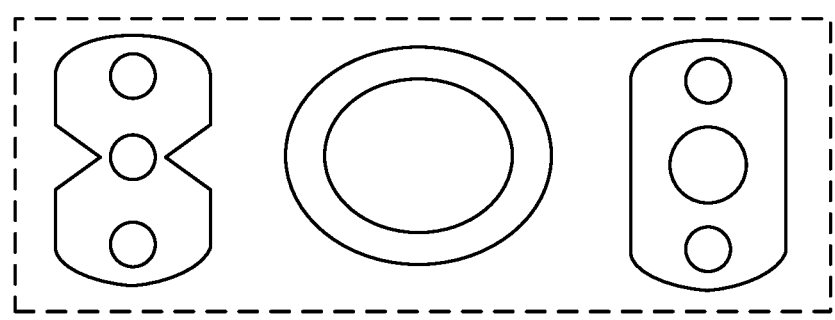
FIG. 5 is a profile diagram of an optical cable without an optical cable suspension wire according to an embodiment of this application.
Figure 6:
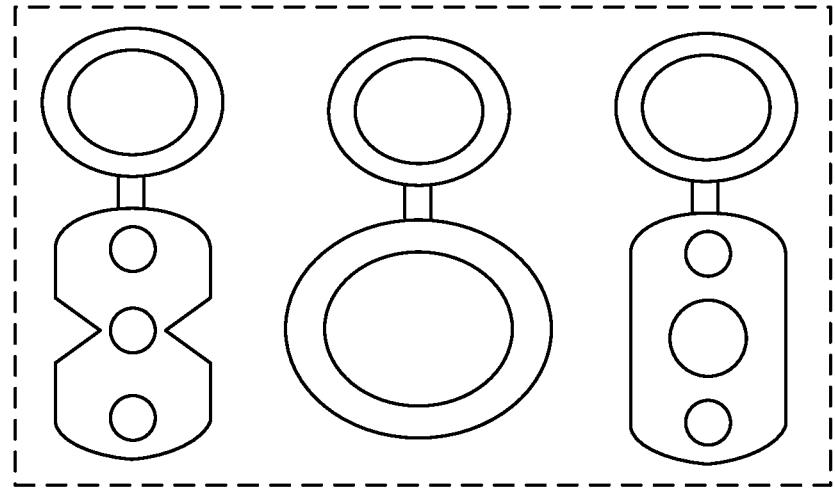
FIG. 6 is a profile diagram of an optical cable with an optical cable suspension wire according to an embodiment of this application.

The optical cable 1 is a communication cable component that is manufactured to meet optical, mechanical, and environmental performance specifications, uses one or more optical fibers in a jacket as a transmission medium, and can be used independently or in a group. Based on forms of optical cables, optical cables may be classified into an optical cable with an optical cable suspension wire (such as a FIG. 8 optical cable) and an optical cable without an optical cable suspension wire (such as a flat drop cable). When an optical cable with an optical cable suspension wire is in an initial state, the optical cable suspension wire is combined with the optical cable along a length direction. A function of the optical cable suspension wire is to ensure that the optical cable can bear its own weight under gravity and an external load in an aerial (or referred to as suspended) state, to strengthen the optical cable. An optical cable without an optical cable suspension wire has high material strength, and can bear its own weight under gravity and an external load in an aerial mode even without an optical cable suspension wire. The optical cable 1 provided in this embodiment of this application may have an optical cable suspension wire, or may not have an optical cable suspension wire. This is not specifically limited in this application. FIG. 5 is a profile diagram (a cross-sectional view) of an optical cable without an optical cable suspension wire according to an embodiment of this application. FIG. 6 is a profile diagram (a cross-sectional view) of an optical cable with an optical cable suspension wire according to an embodiment of this application.

An optical cable 1 provided in an embodiment of this application sequentially includes an insertion section 11, an optical cable connection section 12, and an optical cable extension section 13. An end of the insertion section 11 is configured to connect to an optical fiber connector 2. The optical cable connection section 12 is configured to connect to the traction member connection section 32 through a branch cable fastener 4. The optical cable extension section 13 refers to a part of the optical cable 1 other than the insertion section 11 and the optical cable connection section 12. The optical cable extension section 13 is generally long.

It should be noted that, one optical cable may have two insertion sections 11, two optical cable connection sections 12, and one optical cable extension section 13. For example, from one end to the other end of the optical cable, the optical cable sequentially includes an insertion section 11, an optical cable connection section 12, an optical cable extension section 13, an optical cable connection section 12, and an insertion section 11. In other words, each of two ends of the prefabricated cable provided in this embodiment of this application may be connected to an optical fiber connector 2. It should also be noted that, the foregoing division of the optical cable 1 into the insertion section 11, the optical cable connection section 12, and the optical cable extension section 13 is merely logical division. In an actual product, there is no actual boundary between the insertion section 11, the optical cable connection section 12, and the optical cable extension section 13.

The optical fiber connector 2 is a device for detachable connection between optical fibers, and can precisely connect two end surfaces of optical fibers, so that light energy output by a transmitting optical fiber can be coupled to a receiving optical fiber to a maximum extent. The prefabricated cable provided in this embodiment of this application may include only one optical fiber connector 2, or may include a plurality of optical fiber connectors 2. The optical cable 1 in the prefabricated cable may have only one end connected to the optical fiber connector 2 (in other words, has only one insertion section 11), or may have two ends each connected to an optical fiber connector 2 (in other words, has two insertion sections 11). Specifically, each end of the prefabricated cable may be connected to one optical fiber connector 2 (as shown in FIG. 1), or may be connected to a plurality of optical fiber connectors 2 (as shown in FIG. 2). It should be noted that, the connection between the optical cable 1 and the optical fiber connector 2 in this embodiment of this application includes a mechanical connection between the jacket of the optical cable 1 and the optical fiber connector 2, and also includes an optical connection between an optical fiber in the optical cable 1 and the optical fiber connector 2.

The traction member 3 is configured to pull the optical cable 1. The traction member may be an optical cable suspension wire as a part of the optical cable 1 or may be an additional component such as an additional traction rope. The traction member 3 includes a traction section 31 and a traction member connection section 32. The traction section 31 and the insertion section 11 extend in a same direction. The traction member connection section 32 is connected to the optical cable connection section 12 through the branch cable fastener 4. A handle end 310 of the traction section 31 may have a handle structure (where the handle end 310 is an end of the traction section 31 away from the traction member connection section 32), making it convenient for construction personnel to grip and apply force to the traction member 3. For example, the handle structure may be any structure that is convenient for construction personnel to grip, such as a pull ring, a knob handle, or a grip handle. A position of the handle end 310 may be close to a position of the optical fiber connector 2. It should be noted that, the foregoing division of the traction member 3 into the traction section 31 and the traction member connection section 32 is merely logical division. In an actual product, there is no actual boundary between the traction section 31 and the traction member connection section 32.

The branch cable fastener 4 is configured to tightly clamp the optical cable suspension wire and the optical cable together, so as to prevent the optical cable suspension wire from being separated from the optical cable. Alternatively, the branch cable fastener 4 is configured to fix a plurality of branch cables together to prevent the plurality of branch cables from being separated.

In the solution shown in this embodiment of this application, when the prefabricated cable provided in this embodiment of this application is used during network construction, construction personnel may pull the prefabricated cable by dragging the traction member 3 with a hand, thereby facilitating operations of the construction personnel. In addition, because the traction member 3 is connected to the optical cable 1, a force-bearing point during pulling of the prefabricated cable is located on the optical cable 1 instead of the optical fiber connector 2, thereby reducing a possibility of damage to the optical fiber connector 2 and a junction between the optical fiber connector 2 and the optical cable 1.

The following describes the prefabricated cable provided in this embodiment of this application in more detail by using an example in which the optical cable 1 has an optical cable suspension wire and an example in which the optical cable 1 does not have an optical cable suspension wire.

(1) When the optical cable 1 has an optical cable suspension wire, the traction member 3 may be the optical cable suspension wire.

As shown in FIG. 1, the traction member 3 further includes a traction member extension section 33. The traction member extension section 33 is located on a side of the traction member connection section 32 away from the traction section 31. The optical cable extension section 13 and the traction member extension section 33 are integrated, and the insertion section 11 is separated from the traction section 31. The branch cable fastener is sleeved on the optical cable connection section 12 and the traction member connection section 32.

In a related technology, during fabrication of a prefabricated cable, to facilitate connection between an optical fiber connector and an end of an optical cable, a part of an optical cable suspension wire is usually cut off, so that an end of the optical cable and a segment of a cable body connected to the end are separated from the optical cable suspension wire. This part may be referred to as an insertion section of the cable.

During fabrication of the prefabricated cable provided in this embodiment of this application, the insertion section 11 of the optical cable 1 also needs to be separated from the optical cable suspension wire. However, because the optical cable suspension wire needs to be used as the traction member 3, the optical cable suspension wire is not cut off during fabrication, but instead, the optical cable suspension wire combined with the insertion section 11 is stripped, the stripped optical cable suspension wire is placed aside, and then the optical fiber connector 2 is connected to the optical cable 1. A part of the stripped optical cable suspension wire is separated from the insertion section 11, and this part may be referred to as the traction section 31.

To facilitate stripping of the optical cable suspension wire and the optical cable 1, a width of a suspension wire neck of the optical cable 1 in the prefabricated cable is greater than 0.3 mm and less than 1 mm. The suspension wire neck is a joint part of the optical cable suspension wire and the optical cable 1.

A size of the suspension wire neck of the optical cable suspension wire is set to be within the foregoing size range, so that the size of the suspension wire neck is smaller than a size of a conventional suspension wire neck. In this way, the optical cable suspension wire and the optical cable 1 may be stripped manually without using any tool, thereby improving stripping efficiency, and improving efficiency of connecting the optical fiber connector 2 to the optical cable 1. In addition, because the optical cable suspension wire and the optical cable 1 do not need to be cut off by using a tool, the jacket of the optical cable 1 is not easily damaged. In this way, tightness of a junction between the insertion section 11 and the optical fiber connector 2 is improved, thereby improving an IP protection level of the optical fiber connector 2.

To prevent the optical cable suspension wire from being separated from the optical cable 1 without limitation, the branch cable fastener 4 may be used to tightly clamp the traction member connection section 32 of the traction member 3 and the optical cable connection section 12 of the optical cable 1 together.

(2) When the optical cable 1 does not have an optical cable suspension wire, the traction member 3 may be a traction rope.

As shown in FIG. 2, the branch cable fastener 4 is sleeved on the optical cable connection section 12, and the traction member connection section 32 is connected to the branch cable fastener 4.

For example, the branch cable fastener 4 has two connection holes 41 along an axial direction. The traction section 31 includes a first traction section 311 and a second traction section 312. The traction member connection section 32 is located between the first traction section 311 and the second traction section 312. Both the first traction section 311 and the second traction section 312 are separated from the insertion section 11. A part of the traction member connection section 32 is located in the two connection holes 41, and the other part of the traction member connection section 32 is located between two ends of the two connection holes 41 away from the optical fiber connector 2.

Figure 3:
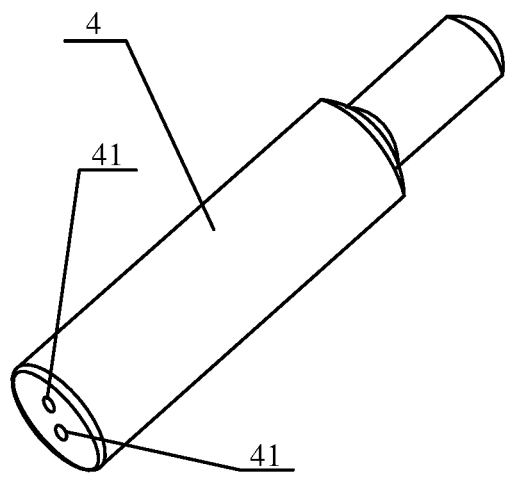
FIG. 3 is a schematic diagram of a branch cable fastener according to an embodiment of this application.
Figure 4:
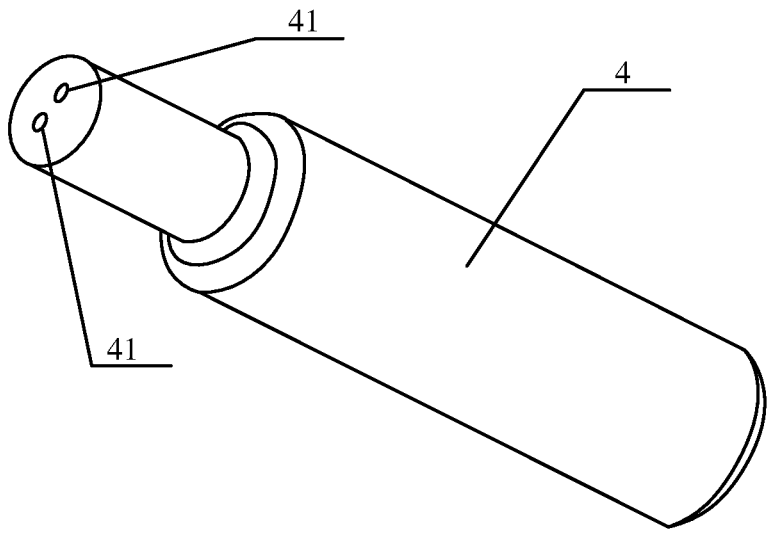
FIG. 4 is a schematic diagram of a branch cable fastener according to an embodiment of this application.

FIG. 3 and FIG. 4 are schematic diagrams of a branch cable fastener 4 according to an embodiment of this application. The branch cable fastener 4 has two connection holes 41 along an axial direction. To connect a traction rope, the traction rope is passed through the two connection holes 41 in sequence, and then two handle structures are formed at two ends of the traction rope. It should be noted that, a related structure in which the branch cable fastener 4 is sleeved on the optical cable connection section 12 is not shown in FIG. 3 and FIG. 4.

To facilitate connection between the optical fiber connector 2 and the end of the insertion section 11, a length of the insertion section 11 cannot be excessively short; otherwise, fabrication of the optical fiber connector 2 may be affected. For example, for an optical cable with an optical cable suspension wire, if the insertion section 11 is excessively short, the optical cable suspension wire affects fabrication of the optical fiber connector 2. In a possible implementation, the length of the insertion section 11 is greater than 0.5 m and less than 1.5 m. More specifically, the length of the insertion section 11 is greater than 0.5 m and less than 1 m.

To improve a capability of the prefabricated cable to pass through an obstacle, in a possible implementation, the branch cable fastener 4 has a streamlined structure along a length direction of the optical cable 1.

The streamlined structure may mean that the branch cable fastener 4 has a rounded corner structure or a chamfer structure along the length direction.

With the configuration of the branch cable fastener 4 to have the streamlined structure, when the prefabricated cable is pulled to pass through an obstacle, the branch cable fastener 4 is not easily stuck by the obstacle, thereby improving the capability of the prefabricated cable to pass through the obstacle.

To better pull the prefabricated cable, the prefabricated cable further includes a bundling member 5. The bundling member 5 wraps the insertion section 11 and the traction section 31 together.

The bundling member 5 may be a rope, a bundling tape, or the like, but is not limited thereto.

With the configuration of the bundling member 5 to bundle the insertion section 11 and the traction section 31 together, when the prefabricated cable is pulled by using the traction member 3, the optical fiber connector 2 can better follow the traction member 3 and the optical cable 1 to move, thereby reducing amplitude of shaking of the optical fiber connector 2 and improving safety of the optical fiber connector 2.

In a state in which the insertion section 11 and the traction section 31 are bundled through the bundling member 5, a position of the handle end 310 may be close to a position of the optical fiber connector 2, making it more convenient for construction personnel to pull the prefabricated cable.

For example, the handle end 310 protrudes from a top end of the optical fiber connector 2, and a distance between the handle end 310 and the top end of the optical fiber connector 2 is less than or equal to 10 mm. Alternatively, the handle end 310 recedes from the top end of the optical fiber connector 2, and the distance between the handle end 310 and the top end of the optical fiber connector 2 is less than or equal to 10 mm. Alternatively, a top end of the handle end 310 is flush with the top end of the optical fiber connector 2.

The foregoing descriptions are only optional embodiments of this application, but are not intended to limit this application. Any modification, equivalent replacement, or improvement made within the principle of this application should fall within the protection scope of this application.

What is claimed is:

1. A prefabricated cable, comprising an optical cable, an optical fiber connector, a traction member, and a branch cable fastener, wherein the optical cable sequentially comprises an insertion section, an optical cable connection section, and an optical cable extension section, and the optical fiber connector is connected to an end of the insertion section;

the traction member comprises a traction section and a traction member connection section; and the traction member connection section is connected to the optical cable connection section through the branch cable fastener, and the insertion section and the traction section extend in a same direction, wherein a handle end of the traction section has a handle structure, the handle structure comprises a knob structure, and the handle end is an end of the traction section away from the traction member connection section, wherein the handle end of the traction section is flush with a top end of the optical fiber connector.

2. The prefabricated cable according to claim 1, wherein the traction member is an optical cable suspension wire;

the traction member further comprises a traction member extension section, and the traction member extension section is located on a side of the traction member connection section away from the traction section;

the optical cable extension section and the traction member extension section are integrated, and the insertion section is separated from the traction section; and the branch cable fastener is sleeved on the optical cable connection section and the traction member connection section.

3. The prefabricated cable according to claim 2, wherein a width of a suspension wire neck of the optical cable suspension wire is greater than 0.3 mm and less than 1 mm, and a height of the suspension wire neck of the optical cable suspension wire is greater than 0.5 mm and less than 1.5 mm.

4. The prefabricated cable according to claim 1, wherein the traction member is a traction rope; and
the branch cable fastener is sleeved on the optical cable connection section, and the traction member connection section is connected to the branch cable fastener.

5. The prefabricated cable according to claim 4, wherein the branch cable fastener has two connection holes along an axial direction;
the traction section comprises a first traction section and a second traction section, and the traction member connection section is located between the first traction section and the second traction section;
both the first traction section and the second traction section are separated from the insertion section; and
a part of the traction member connection section is located in the two connection holes, and the other part of the traction member connection section is located between two ends of the two connection holes away from the optical fiber connector.

6. The prefabricated cable according to claim 2, wherein the branch cable fastener has a streamlined structure along a length direction of the optical cable.

7. The prefabricated cable according to claim 1, wherein a length of the insertion section is greater than 0.5 m and less than 1.5 m.

8. The prefabricated cable according to claim 1, wherein the prefabricated cable further comprises a bundling member, and the bundling member wraps the insertion section and the traction section together.

9. The prefabricated cable according to claim 8, wherein the handle end of the traction section protrudes from a top end of the optical fiber connector, and a distance between the handle end and the top end of the optical fiber connector is less than or equal to 10 mm; or
the handle end of the traction section recedes from the top end of the optical fiber connector, and a distance between the handle end and the top end of the optical fiber connector is less than or equal to 10 mm.

10. The prefabricated cable according to claim 1, wherein the handle end of the traction section is flush with a top end of the optical fiber connector.

11. A method, comprising:
connecting an optical fiber connector of a prefabricated cable to a device in an optical distribution network (ODN), wherein the prefabricated cable comprises an optical cable, the optical fiber connector, a traction member, and a branch cable fastener, wherein
the optical cable sequentially comprises an insertion section, an optical cable connection section, and an optical cable extension section, and the optical fiber connector is connected to an end of the insertion section;
the traction member comprises a traction section and a traction member connection section; and
the traction member connection section is connected to the optical cable connection section through the branch cable fastener, and the insertion section and the traction section extend in a same direction, wherein a handle end of the traction section has a handle structure, the handle structure comprises a knob structure, and the handle end is an end of the traction section away from the traction member connection section, wherein the handle end of the traction section is flush with a top end of the optical fiber connector.

12. The method according to claim 11, wherein the traction member is an optical cable suspension wire;
the traction member further comprises a traction member extension section, and the traction member extension section is located on a side of the traction member connection section away from the traction section;
the optical cable extension section and the traction member extension section are integrated, and the insertion section is separated from the traction section; and
the branch cable fastener is sleeved on the optical cable connection section and the traction member connection section.

13. The method according to claim 12, wherein a width of a suspension wire neck of the optical cable suspension wire is greater than 0.3 mm and less than 1 mm, and a height of the suspension wire neck of the optical cable suspension wire is greater than 0.5 mm and less than 1.5 mm.

14. The method according to claim 11, wherein the traction member is a traction rope; and
the branch cable fastener is sleeved on the optical cable connection section, and the traction member connection section is connected to the branch cable fastener.

15. The method according to claim 14, wherein the branch cable fastener has two connection holes along an axial direction;
the traction section comprises a first traction section and a second traction section, and the traction member connection section is located between the first traction section and the second traction section;
both the first traction section and the second traction section are separated from the insertion section; and
a part of the traction member connection section is located in the two connection holes, and the other part of the traction member connection section is located between two ends of the two connection holes away from the optical fiber connector.

16. The method according to claim 12, wherein the branch cable fastener has a streamlined structure along a length direction of the optical cable.

17. The method according to claim 11, wherein a length of the insertion section is greater than 0.5 m and less than 1.5 m.

18. The method according to claim 11, wherein the prefabricated cable further comprises a bundling member, and the bundling member wraps the insertion section and the traction section together.

19. The method according to claim 18, wherein the handle end of the traction section protrudes from a top end of the optical fiber connector, and a distance between the handle end and the top end of the optical fiber connector is less than or equal to 10 mm; or
the handle end of the traction section recedes from the top end of the optical fiber connector, and a distance between the handle end and the top end of the optical fiber connector is less than or equal to 10 mm.

20. The method according to claim 11, the handle end of the traction section is flush with a top end of the optical fiber connector.

* * * * *